(12) United States Patent
Eyer

(10) Patent No.: US 9,997,200 B2
(45) Date of Patent: Jun. 12, 2018

(54) VIDEO BOOKMARKING

(71) Applicant: SATURN LICENSING LLC, New York, NY (US)

(72) Inventor: Mark Kenneth Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days. days.

(21) Appl. No.: 14/196,432

(22) Filed: Mar. 4, 2014

(65) Prior Publication Data

US 2014/0186008 A1 Jul. 3, 2014

Related U.S. Application Data

(63) Continuation of application No. 12/881,361, filed on Sep. 14, 2010, now Pat. No. 8,705,933.

(Continued)

(51) Int. Cl.
*G11B 27/10* (2006.01)
*H04N 5/76* (2006.01)
(Continued)

(52) U.S. Cl.
CPC ............ *G11B 27/10* (2013.01); *G11B 27/105* (2013.01); *H04N 5/76* (2013.01); *H04N 7/17318* (2013.01);
(Continued)

(58) Field of Classification Search
CPC ......... G11B 27/105; G11B 27/10; H04N 5/76
(Continued)

(56) References Cited

U.S. PATENT DOCUMENTS 5,740,304 A    4/1998  Katsuyama et al.
5,860,068 A    1/1999  Cook
(Continued)

FOREIGN PATENT DOCUMENTS

KR   2004-0041082   5/2004
KR   2005-0049975   5/2005
(Continued)

OTHER PUBLICATIONS

U.S. Appl. No. 13/216,375, filed Aug. 24, 2011, 2012-0063508, Hattori, et al.
(Continued)

*Primary Examiner* — Mishawn Hunter
(74) *Attorney, Agent, or Firm* — Oblon, McClelland, Maier & Neustadt, L.L.P.

(57) ABSTRACT

The video bookmark feature allows a user to tag an item or segment of interest within audio/video content being watched. Each tag, or bookmark, can contain within it metadata associated with the content captured by the receiver at the time the bookmark was recorded; further information can be derived via interaction over the Internet with a service provider. Applications supported by video bookmarks include telescoping ads, capturing screen shots for later review or printing, and retrieving more information about any arbitrary subject being viewed, whether it is a scene in a program, an advertisement, or other associated information about the subject. This abstract is not to be considered limiting, since other embodiments may deviate from the features described in this abstract.

15 Claims, 7 Drawing Sheets

Related U.S. Application Data

(60) Provisional application No. 61/258,715, filed on Nov. 6, 2009, provisional application No. 61/245,955, filed on Sep. 25, 2009.

(51) Int. Cl.

| | | |
|---|---|---|
| *H04N 7/173* | (2011.01) | |
| *H04N 21/235* | (2011.01) | |
| *H04N 21/434* | (2011.01) | |
| *H04N 21/435* | (2011.01) | |
| *H04N 21/4722* | (2011.01) | |
| *H04N 21/482* | (2011.01) | |
| *H04N 21/845* | (2011.01) | |
| *H04N 9/82* | (2006.01) | |

(52) U.S. Cl.
CPC ......... *H04N 21/235* (2013.01); *H04N 21/435* (2013.01); *H04N 21/4348* (2013.01); *H04N 21/4722* (2013.01); *H04N 21/482* (2013.01); *H04N 21/8455* (2013.01); *H04N 9/8205* (2013.01); *H04N 9/8227* (2013.01)

(58) Field of Classification Search
USPC ........ 386/241, 243, 248, 291, 332; 725/109, 725/134; 455/556.1; 707/999.01
See application file for complete search history.

(56) References Cited

U.S. PATENT DOCUMENTS

| | | | |
|---|---|---|---|
| 5,905,865 A | 5/1999 | Palmer et al. | |
| 5,907,322 A | 5/1999 | Kelly et al. | |
| 5,918,213 A | 6/1999 | Bernard et al. | |
| 5,974,004 A | 10/1999 | Dockes et al. | |
| 6,032,130 A | 2/2000 | Alloul et al. | |
| 6,139,197 A | 10/2000 | Banks | |
| 6,192,340 B1 | 2/2001 | Abecassis | |
| 6,289,346 B1 | 9/2001 | Milewski et al. | |
| 6,535,912 B1* | 3/2003 | Anupam ........... G06F 17/30884 707/E17.114 | |
| 6,578,047 B1 | 6/2003 | Deguchi | |
| 6,591,419 B2 | 7/2003 | Barry et al. | |
| 6,721,489 B1 | 4/2004 | Benyamin et al. | |
| 6,735,628 B2 | 5/2004 | Eyal | |
| 6,772,212 B1 | 8/2004 | Lau et al. | |
| 6,915,176 B2 | 7/2005 | Novelli et al. | |
| 6,941,275 B1 | 9/2005 | Swierczek | |
| 7,143,353 B2 | 11/2006 | McGee et al. | |
| 7,190,971 B1 | 3/2007 | Kawamoto | |
| 7,302,481 B1* | 11/2007 | Wilson ............... H04L 63/0281 709/224 | |
| 8,595,783 B2 | 11/2013 | Dewa | |
| 2002/0060750 A1 | 5/2002 | Istvan et al. | |
| 2003/0005463 A1 | 1/2003 | MacRae et al. | |
| 2003/0135539 A1* | 7/2003 | Kondo ............... G06F 17/30867 709/201 | |
| 2003/0135853 A1 | 7/2003 | Goldman et al. | |
| 2003/0199772 A1 | 10/2003 | Letort et al. | |
| 2004/0128317 A1 | 7/2004 | Sull et al. | |
| 2004/0194034 A1* | 9/2004 | Vlamis .................... G06F 17/24 715/255 | |
| 2005/0210145 A1 | 9/2005 | Kim et al. | |
| 2007/0033292 A1 | 2/2007 | Sull et al. | |
| 2007/0189719 A1 | 8/2007 | Furumachi et al. | |
| 2007/0244903 A1 | 10/2007 | Ratliff et al. | |
| 2007/0288426 A1 | 12/2007 | Schachter | |
| 2007/0294265 A1* | 12/2007 | Askew ............... G06F 17/30884 | |
| 2008/0005126 A1* | 1/2008 | Sankaran et al. ............. 707/10 | |
| 2008/0092168 A1 | 4/2008 | Logan et al. | |
| 2008/0172399 A1* | 7/2008 | Chi .................... G06F 17/30884 | |
| 2008/0263180 A1* | 10/2008 | Hurst ................. H04L 67/1008 709/219 | |
| 2008/0281805 A1* | 11/2008 | Xiaolu ............... G06F 17/30289 | |
| 2009/0083278 A1* | 3/2009 | Zhao ................. G06F 17/30896 | |
| 2009/0089651 A1* | 4/2009 | Herberger ......... G06F 17/30056 715/202 | |
| 2009/0106356 A1* | 4/2009 | Brase ................... G06F 17/3002 709/203 | |
| 2010/0002606 A1* | 1/2010 | Preis .................... H04Q 3/0025 370/259 | |
| 2010/0027966 A1 | 2/2010 | Harrang et al. | |
| 2010/0042642 A1 | 2/2010 | Shahraray et al. | |
| 2010/0088726 A1* | 4/2010 | Curtis ................... G11B 27/034 725/45 | |
| 2010/0123735 A1 | 5/2010 | Blanchard et al. | |
| 2010/0154012 A1* | 6/2010 | Clavenna et al. ............ 725/109 | |
| 2010/0269152 A1* | 10/2010 | Pahlavan ............... G06F 9/4445 726/3 | |
| 2011/0075990 A1 | 3/2011 | Eyer | |
| 2011/0088075 A1 | 4/2011 | Eyer | |
| 2011/0093492 A1 | 4/2011 | Sull et al. | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer et al. | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0145414 A1 | 6/2013 | Yamagishi | |
| 2013/0167171 A1 | 6/2013 | Kitazato et al. | |
| 2013/0191860 A1 | 7/2013 | Kitazato et al. | |
| 2013/0198768 A1 | 8/2013 | Kitazato | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0215327 A1 | 8/2013 | Kitazato et al. | |
| 2013/0250173 A1 | 9/2013 | Eyer | |
| 2013/0254824 A1 | 9/2013 | Eyer | |
| 2013/0258191 A1 | 10/2013 | Eyer | |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0291049 A1 | 10/2013 | Kitazato | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0020038 A1 | 1/2014 | Dewa | |
| 2014/0020042 A1 | 1/2014 | Eyer | |
| 2014/0040965 A1 | 2/2014 | Kitazato et al. | |

(56) References Cited

U.S. PATENT DOCUMENTS

| | | |
|---|---|---|
| 2014/0040968 A1 | 2/2014 | Kitazato et al. |
| 2014/0043540 A1 | 2/2014 | Kitazato et al. |
| 2014/0053174 A1 | 2/2014 | Eyer et al. |

FOREIGN PATENT DOCUMENTS

| | | |
|---|---|---|
| KR | 2006-0043390 | 5/2006 |
| WO | WO 98/17063 | 4/1998 |

OTHER PUBLICATIONS

U.S. Appl. No. 13/107,604, filed May 13, 2011, 2012-0072965, Dewa.
U.S. Appl. No. 13/238,080, filed Sep. 21, 2011, 2012-0082266, Kitazato, et al.
U.S. Appl. No. 13/212,972, filed Aug. 18, 2011, 2012-0050620, Kitazato.
U.S. Appl. No. 13/220,231, filed Aug. 29, 2011, 2012-0060197, Kitahara, et al.
U.S. Appl. No. 13/081,566, filed Apr. 7, 2011, 2012-0054784, Kitazato, et al.
U.S. Appl. No. 13/038,939, filed Mar. 2, 2011, 2011-0302599, Eyer.
U.S. Appl. No. 12/985,241, filed Jan. 5, 2011, 2011-0243536, Eyer.
U.S. Appl. No. 13/043,170, filed Mar. 8, 2011, 2012-0047531, Eyer.
U.S. Appl. No. 13/041,743, filed Mar. 7, 2011, 2012-0044418, Eyer.
U.S. Appl. No. 13/039,005, filed Mar. 2, 2011, 2011-0299827, Eyer.
U.S. Appl. No. 13/071,560, filed Mar. 25, 2011, 2012-0054268, Yamagisii.
U.S. Appl. No. 13/071,559, filed Mar. 25, 2011, 2012-0054267, Yamagishi, et al.
U.S. Appl. No. 13/071,238, filed Mar. 24, 2011, 2012-0054783, Yamagishi.
U.S. Appl. No. 13/075,440, filed Mar. 30, 2011, 2012-0054214, Yamagishi, et al.
U.S. Appl. No. 12/881,361, filed Sep. 14, 2010, 2011-0075990, Eyer.
U.S. Appl. No. 13/046,579, filed Mar. 11, 2011, 2011-0247028, Eyer.
U.S. Appl. No. 13/206,627, filed Aug. 10, 2011, 2012-0084802, Kitazato.
U.S. Appl. No. 13/238,065, filed Sep. 21, 2011, 2012-0081607, Kitazato.
U.S. Appl. No. 12/942,835, filed Nov. 9, 2010, 2011-0246488, Eyer.
U.S. Appl. No. 13/009,720, filed Jan. 19, 2011, 2012-0185888, Eyer, et al.
U.S. Appl. No. 13/304,126, filed Nov. 23, 2011, 2012-0275764, Eyer.
U.S. Appl. No. 13/080,866, filed Apr. 6, 2011, 2012-0054235, Kitazato, et al.
U.S. Appl. No. 13/071,551, filed Mar. 25, 2011, 2012-0050619, Kitazato, et al.
U.S. Appl. No. 13/239,871, filed Sep. 22, 2011, 2012-0084824, Kitazato.
U.S. Appl. No. 13/238,138, filed Sep. 21, 2011, 2012-0084829, Kitazato.
U.S. Appl. No. 13/238,277, filed Sep. 21, 2011, 2012-0081508, Kitazato.
U.S. Appl. No. 13/238,264, filed Sep. 21, 2011, 2012-0082440, Kitazato.
U.S. Appl. No. 12/798,118, filed Mar. 30, 2010, 2011-0088075, Eyer.
U.S. Appl. No. 13/038,984, filed Mar. 2, 2011, 2011-0298981, Eyer.
U.S. Appl. No. 13/038,967, filed Mar. 2, 2011, 2011-0302611, Eyer.
U.S. Appl. No. 12/959,529, filed Dec. 3, 2010, 2011-0307920, Blanchard, et.
U.S. Appl. No. 13/422,203, filed Mar. 16, 2012, 2012-0253826, Kitazato, et al.
U.S. Appl. No. 13/452,376, filed Apr. 20, 2012, 2012-0274848, Kitahara, et al.
U.S. Appl. No. 13/562,946, filed Jul. 31, 2012, 2013-0055313, Eyer.
U.S. Appl. No. 13/559,166, filed Jul. 26, 2012, 2013-0036440, Eyer.
U.S. Appl. No. 13/490,216, filed Jun. 6, 2012, 2013-0024894, Eyer.
U.S. Appl. No. 13/554,688, filed Jul. 20, 2012, 2013-0031569, Eyer.
U.S. Appl. No. 13/559,188, filed Jul. 26, 2012, 2013-0198768, Kitazato.
U.S. Appl. No. 13/527,435, filed Jun. 19, 2012, 2013-0024897, Eyer.
U.S. Appl. No. 13/587,975, filed Aug. 17, 2012, 2013-0212634, Kitazato.
U.S. Appl. No. 13/593,554, filed Aug. 24, 2012, 2013-0215327, Kitazato et al.
U.S. Appl. No. 13/648,753, filed Oct. 10, 2012, 2013-0103716, Yamagishi.
U.S. Appl. No. 13/679,624, filed Nov. 16, 2012, 2013-0145414, Yamagishi.
U.S. Appl. No. 13/708,313, filed Dec. 7, 2012, 2013-0167171, Kitazato et al.
U.S. Appl. No. 13/741,863, filed Jan. 15, 2013, 2013-0191860, Kitazato et al.
U.S. Appl. No. 13/753,591, filed Jan. 30, 2013, 2013-0201399, Kitazato et al.
U.S. Appl. No. 13/777,429, filed Feb. 26, 2013, 2014-0043540, Kitazato et al.
U.S. Appl. No. 13/777,693, filed Feb. 26, 2013, 2014-0040965, Kitazato et al.
U.S. Appl. No. 13/777,734, filed Feb. 26, 2013, 2014-0013379, Kitazato et al.
U.S. Appl. No. 13/782,694, filed Mar. 1, 2013, 2013-0254824, Eyer.
U.S. Appl. No. 13/782,730, filed Mar. 1, 2013, 2013-0283311, Eyer.
U.S. Appl. No. 13/800,818, filed Mar. 13, 2013, 2013-0250173, Eyer.
U.S. Appl. No. 13/800,734, filed Mar. 13, 2013, 2013-0258191, Eyer.
U.S. Appl. No. 13/841,343, filed Mar. 15, 2013, 2013-0205327, Eyer.
U.S. Appl. No. 13/846,282, filed Mar. 18, 2013, 2013-0282870, Dewa et al.
U.S. Appl. No. 13/846,247, filed Mar. 18, 2013, 2014-0040968, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, 2013-0340007, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, 2013-0291022, Eyer.
U.S. Appl. No. 13/997,844, filed Jun. 25, 2013, 2013-0283328, Kitazato.
U.S. Appl. No. 13/927,667, filed Jun. 26, 2013, Yamagishi.
U.S. Appl. No. 13/934,581, filed Jul. 3, 2013, 2014-0020042, Eyer.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, Yamagishi.
U.S. Appl. No. 13/934,473, filed Jul. 3, 2013, Yamagishi.
U.S. Appl. No. 13/955,130, filed Jul. 31, 2013, Fay.
U.S. Appl. No. 13/963,138, filed Aug. 9, 2013, Fay et al.
U.S. Appl. No. 13/963,111, filed Aug. 9, 2013, Fay et al.
U.S. Appl. No. 13/968,035, filed Aug. 15, 2013, 2014-0053174, Eyer et al.
U.S. Appl. No. 14/025,310, filed Sep. 12, 2013, 2014-0020038, Dewa.
U.S. Appl. No. 14/026,551, filed Sep. 13, 2013, 2014-0013347, Yamagishi.
U.S. Appl. No. 13/976,257, filed Jun. 26, 2013, 2013-0291049, Kitazato.
U.S. Appl. No. 14/046,543, filed Oct. 4, 2013, Fay et al.
U.S. Appl. No. 14/046,566, filed Oct. 4, 2013, Fay et al.
U.S. Appl. No. 14/069,032, filed Oct. 31, 2013, Yamagishi et al.

(56) References Cited

OTHER PUBLICATIONS

U.S. Appl. No. 13/071,560, filed Mar. 25, 2011, 2012-0054268, Yamagishi.
International Search Report and Written Opinion, PCT/US2010/049841, dated May 30, 2011; Received Jun. 22, 2011.
Designing Ubiquitous Personalized TV—Anytime Services, Jazasis et al., CaiSE '03 Workshop Proceedings, vol. 75, Jun. 2003.
Social- and Interactive- Television Applications Based on Real-Time Ambient-Audio Identification, Michael Fink, 4$^{th}$ European Interactive TV Conference, EuroITV 2006, 2006.
Sony EMK-01 E-Marker, Yahoo Shopping, Log2Shop, web page 2002.
Sony EMK-01 E-Marker, Yahoo Shopping, web page 2002.
Bookmark your radio, Xenote iTag, 1999, web page 2000.
Sony writes swan song for radio service, Fried, CNET News, Sep. 5, 2001.
Sony device bookmarks music heard on radio, Fried, CNET News, Jun. 9, 2000.
European Search Report dated Aug. 29, 2013, in PCT/US2010/049841.

* cited by examiner

US 9,997,200 B2

VIDEO BOOKMARKING

CROSS REFERENCE TO RELATED DOCUMENTS

This application is a continuation of U.S. patent application Ser. No. 12/881,361, filed Sep. 14, 2010, which is related to and claims priority benefit of U.S. Provisional Patent Application Nos. 61/245,955 filed Sep. 25, 2009, and 61/258,715 filed Nov. 6, 2009, the entire contents of which are incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Once a digital television is Internet-enabled, delivery of a wide variety of new types of services and features is possible. One current implementation captures viewer actions such as record, play, re-play, pause, etc. and by correlating the precise timing of the action with the channel line-up and channel number; exactly what was being viewed when the action occurred can be determined.

The data capture operates in the background, with no user involvement. Captured data is "anonymized" and sold, as well as mined for useful information to sell to broadcasters and content providers.

A second implementation allows "bookmarking" of songs. If a song comes on that the listener likes, he or she can push a button on the player which causes the title and artist of that song to be reported to a website. Then later, when the user revisits the website, he or she can review the list of bookmarked songs and possibly decide to buy the CD or download and own a copy of the song from an online store. The user can bookmark either the song or the artist.

Metadata can be delivered along with audio/video content. Types of metadata include the title of the program and episode, synopsis, a URL linking to the program or episode's website, content advisory rating, a URL corresponding to more information on a product or service, a content ID tag (unique identifier of content), links to available downloads of past episodes, for example.

BRIEF DESCRIPTION OF THE DRAWINGS

Certain illustrative embodiments illustrating organization and method of operation, together with objects and advantages may be best understood by reference to detailed description that follows taken in conjunction with the accompanying drawings in which.

DETAILED DESCRIPTION

Figure 1:
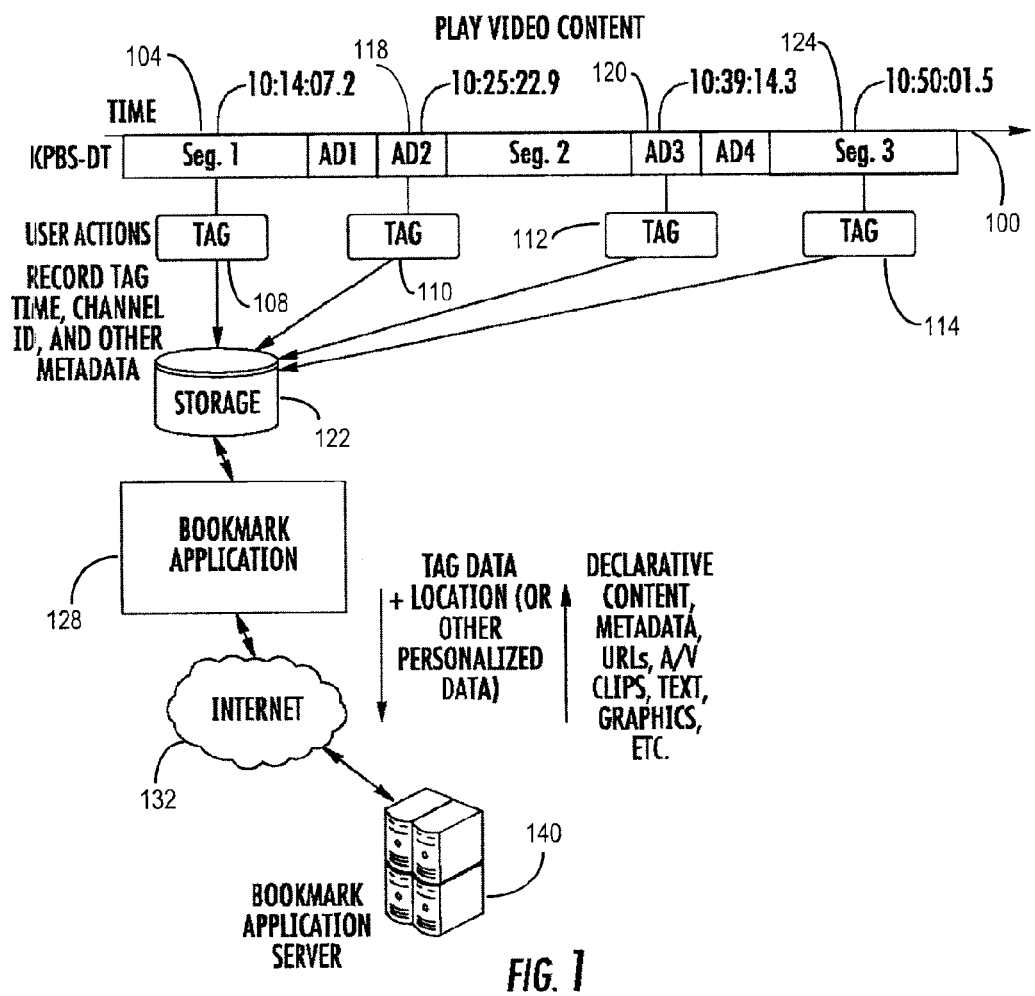
FIG. 1 is a diagram of an exemplary video bookmark system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Software and/or firmware embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can he added and/or enhanced and variations can be made in user interface and information presentation without departing from certain embodiments of the present invention. Such variations are contemplated and considered equivalent.

Content may be embodied as any or all audio, video, multimedia or interactive data that may be encoded with entertainment, training, artistic, textual, or experimental subject matter that is created for playback in modes such as compact disc (CD), digital versatile disc (DVD), high definition DVD (HD-DVD), Blu-ray Disc (BD) of any suitable format, tape, Internet streams or downloads, handheld players, computer storage media or any other suitable playable modes.

When playing and audio/video content stream on a video display device such as a Digital Television (DTV), an Internet-connected DVR or a DTV with recording capability may offer a user a new button on the remote control called "INFO" or "MORE" or "MARK" or "TAG" or "BKMK" or any other label that may uniquely identify the function of generating a video bookmark. Alternatively the video bookmark function may be initiated by use of other remote control actions, such as indirectly through access to a MENU function, or similar. In an exemplary implementation, a viewer pushing the button so labeled may initiate a "bookmark event" which, for purposes of this exemplary implementation, may generate a TAG. Whenever the TAG button is pressed, viewing is not interrupted; the receiver records all the relevant information and metadata pertinent to the content being viewed near the instant of the button press. It may save the last several seconds of a/v material on disk in a file associated with the bookmark. At minimum, the information and metadata may include the exact time of the button press and the channel name and number. For programs being played back from disk, the information would include the identification of the program and the exact timing within the playback. Other data may include any or all of the following without limitation: captured still images, captured audio/visual clips. caption text, metadata in an ancillary data stream, URLs, screen scraped information—a process whereby optical character recognition techniques are used to extract text from the video sampled at the time of the bookmark event, and downloadable objects.

Turning to FIG. 1, an exemplary implementation of a video bookmark system is presented, showing the bookmark events and how bookmark events are processed. In the timeline 100 at the top, a viewer may watch a video segment, labeled Seg. 1 104. During the viewing of a program, at an example time marker of 10:14:07.2, a user may press the TAG button (108, 110, 112, 114), creating a bookmark. The time and channel ID is stored in a computer accessible storage device 122, optionally along with still images or a video clip from the time vicinity of the key press. Other bookmark events occur during advertisements AD2 118 and AD3 120, and again in video segment Seg. 3 124.

In the exemplary implementation, a Bookmark Application 128 may interact through the Internet 132 with a Bookmark Server 140 through the DTV's Internet connection, providing information about the bookmark event to allow the server to identify the program or advertisement within which it occurred; personalized data may optionally be transmitted as well. The server 140 responds with information that is used by the receiver to create an interactive experience representing the subject material of the bookmark. If the bookmark occurs within an advertisement, the material returned may be a URL to a website where further information on that product or service may be found. Or, a URL may be provided that can be selected to purchase the product being offered. Alternatively, the server could return declarative content (such as text and graphics, scripts, etc.), an audio/visual clip, interactive multimedia content or even an application.

Figure 2:
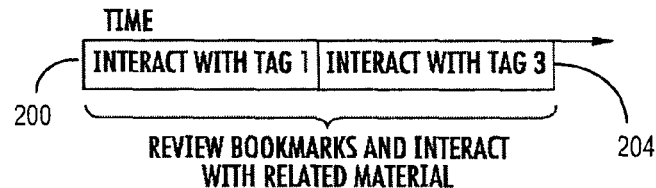
FIG. 2 is a diagram of an example of interaction with video bookmarks consistent with certain embodiments of the present invention.

Turning now to FIG. 2, this figure presents an exemplary implementation for user actions that may occur after the time of storing one or more video bookmarks, for reviewing the content associated with video bookmarks that have been previously stored. In this exemplary implementation, bookmarks that have been recorded during the presentation of a program of video content may be reviewed. As an example, the user may review the stored bookmarks and choose to bring up the content associated with the first bookmark event 200, and at a later time the third bookmark event 204. In a first exemplary embodiment, metadata available to the receiver at the time of the bookmark event would be stored locally, and that information used to create the user interface associated with the "bookmark review" activity. This new user interface provides the user with the ability to view the metadata or a subset thereof and take actions by making menu selections to accomplish functions such as: reviewing stored bookmarks, displaying information from one or more URLs, downloading executable objects, reviewing associated advertising, receiving personalized or localized information, reviewing bookmarked audio or video content, reviewing stored and audio and video clips associated with the subject of the bookmarked content, interacting with downloaded executable objects, viewing or sending email messages, and interactive purchase activities.

Figure 3:
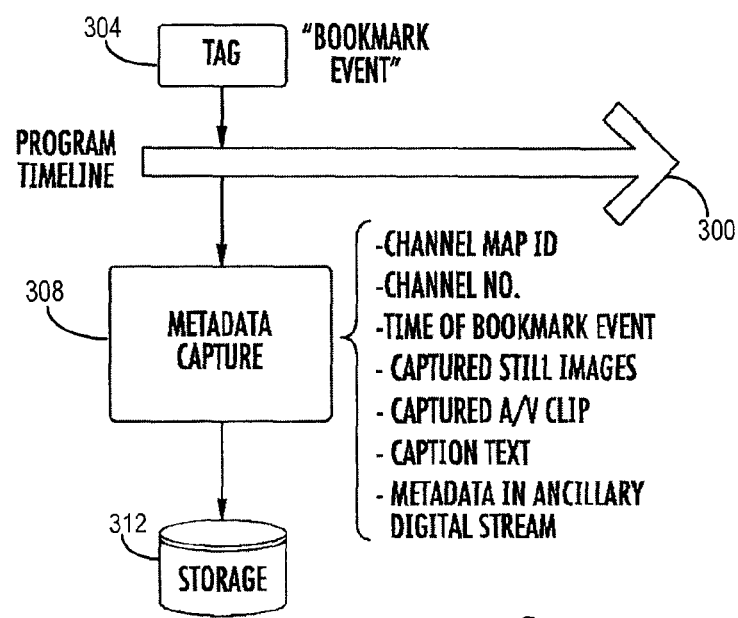
FIG. 3 is an exemplary implementation of a local metadata approach consistent with certain embodiments of the present invention.

Turning now to FIG. 3, an exemplary implementation of a local metadata approach is presented. At the time of each bookmark event, the receiver collects and saves information relevant to the programming being viewed at the time of the user interaction that establishes a video bookmark. This figure depicts the timeline 300 of a program horizontally across the top. A video bookmark event is initiated at a point in the timeline. causing a number of metadata items (plus some samples of the program content itself) 308 to be saved in electronic storage 312 along with the timing of the event. This information might include:

the program title, source channel number and name, program metadata (synopsis, etc.), and time relative to the start of the program the bookmark event occurred;

high-resolution video stills captured from the video that was displayed just prior to the bookmark event;

a short clip of the audio/video material that just preceded the bookmark event;

closed caption text captured from the programming, just prior to the bookmark event; or metadata available from the compressed or uncompressed audio/video distribution feed.

In an additional exemplary implementation, program providers can include various types of digital data within the MPEG-2 Transport Stream (TS) multiplex that delivers the compressed audio/video to the receiver or set-top box such as program or content identification codes, URLs, and the like.

Depending upon the type of information recorded and associated with the bookmark, various types of user experiences could be offered to the user (e.g., via the user interface) when the video bookmark is reviewed at a later time:

For receivers with PVR functionality, the time of the bookmark event can be saved as a regular "chapter point," allowing the user easy navigation to that point when re-playing the program from electronic storage;

Review of the high-resolution video stills, which can serve to allow the user to capture a phone number, address, product name, or other information;

Review of a short clip, for the same purpose;

If metadata is available, the receiver can create a user experience based on it.

In the exemplary implementation, one type of metadata that may he present within the video content, either as an ancillary data stream in the compressed signal or available by extracting it from the uncompressed video or audio signal, is one or more URLs. The content provider can embed URLs for different purposes in the program content. URLs may link to:

the home page of the network a website describing the series a website with photos from the episode if the bookmark event occurred during an advertisement, the URL may link to further information pertinent to the product or service advertised.

As shown, at the time of the bookmark event 304, a number of items of data relevant to the programming content 308 at the time of the event are stored 312, along with stills and/or a clip of the program content. Given that some time elapses between the time the user decides to record a bookmark and the time the button is pressed, the metadata is timed to reflect the state of the program one to three seconds prior to the user action that creates a video bookmark, such as, in an exemplary implementation, the user pressing a button or selecting an option on a video display interface.

After the user performs the action to initiate a video bookmark, he or she may continue enjoying the program. In the background, the receiver processes the metadata associated with the program at the time of the bookmark event. One type of processing involves "screen scraping"—as defined previously.

In the exemplary implementation presented, the image may include textual content; in an example the textual content may consist of a URL. An image processor in the receiver could extract this item from the screen capture and use it to construct the user's experience when this bookmark is revisited later. Other text recovered from the character recognition process may be used in constructing the user experience as well, and to perform other actions such as labeling the bookmark, or any other function needed to process the video bookmark.

Figure 4:
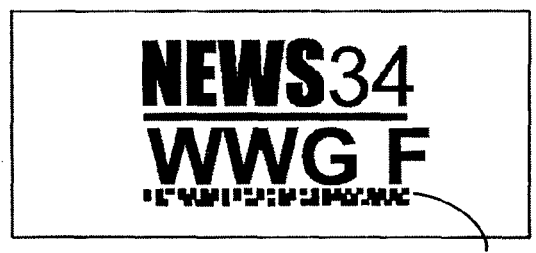
FIG. 4 is an illustrative example of metadata capture within a video barcode event consistent with certain embodiments of the present invention.

Turning now to FIG. 4, this figure presents an exemplary implementation of video barcode 400. In this non-limiting example, a content provider may embed digital data within the video image itself. Like a video fingerprint, the metadata thus embedded in the video image may be used to identify the content itself (the program name, originating broadcast channel, advertisement ID, etc.) Unlike a video fingerprint, which is designed to be difficult or impossible to see visually, a video barcode 400 may be easily visible to the untrained eye.

The purpose of the use of video barcode 400 technology is to allow the metadata inserted by the content provider to survive various stages in the distribution channel. A DTV receiver may receive video from a cable or satellite set-top box, for example, via a High Definition Multimedia Interface (HDMI) uncompressed digital interface. Metadata that might have been present in the digital multiplex when the audio/video programming was distributed in compressed form may not pass through a digital interface such as HDMI.

Figure 5:
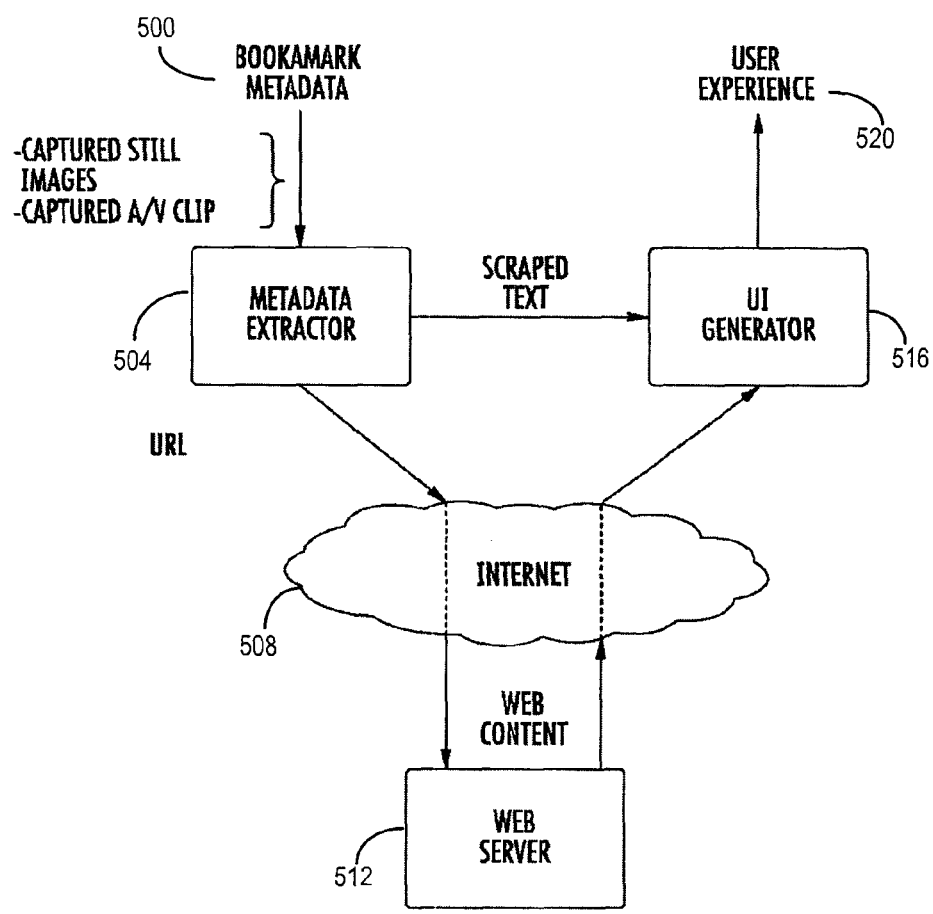
FIG. 5 is a diagram of an illustrative example of bookmark interaction with a web server consistent with certain embodiments of the present invention.

Turning now to FIG. 5, a receiver may utilize metadata gathered at the time of a bookmark event and transmit the bookmark metadata 500 to a metadata extractor application 504. The metadata extractor 504 receives and reformats incoming metadata associated with a video bookmark. In one exemplary operation the metadata extractor 504 may collect and format a video bookmark time, date, channel, URLs, any captured still images and any captured audio/video clips into a message to be stored. The video bookmark and its associated metadata may be transmitted over the Internet 508 and then stored in an electronic storage partition within a web server 512 dedicated to this purpose for a particular user. In this exemplary implementation the web server 512 may process any URLs received with the video bookmark and associate the retrieved web content with the video bookmark. The web server 512 may then transmit all processed video bookmark information through the Internet 508 to a user interface (UI) generator 516 for inclusion in a user oriented presentation of the processed data. Additionally, text that is scraped from a video presentation, such as, in a non-limiting example, textual information that represents a video barcode, may be transmitted to the UI generator 516. The UI generator formats and prepares the textual information for inclusion in the user oriented presentation of the processed data received from the web server 512. The data received from both the metadata extractor 504 and the web server 512, are used to generate a user experience 520 whenever the user wishes to interact with a particular video bookmark.

Figure 6:
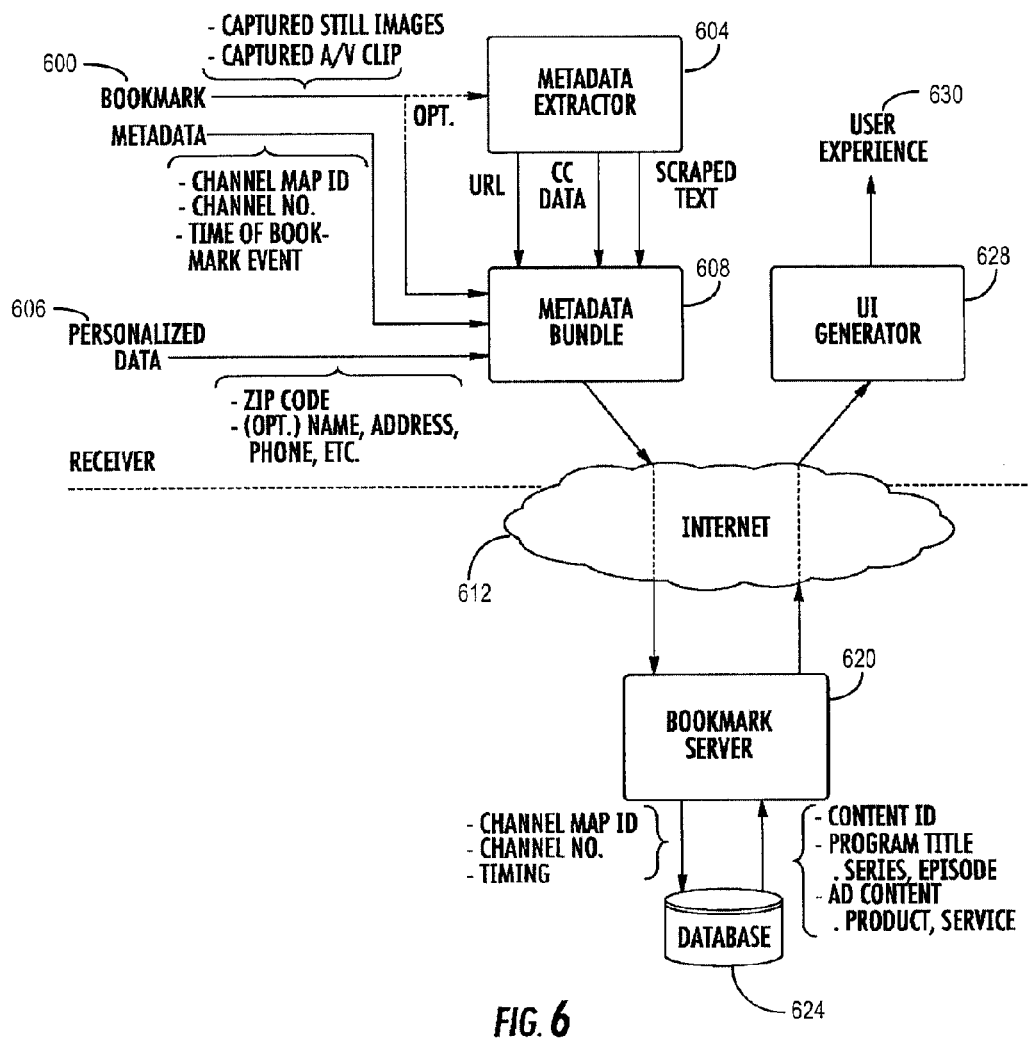
FIG. 6 is a diagram of an illustrative example of bookmark interaction with a video bookmark server consistent with certain embodiments of the present invention.

Turning now to FIG. 6, an exemplary presentation of a video bookmark process is provided. In the exemplary implementation, video bookmark metadata 600 gathered at the time of the bookmark event. Bookmark metadata that may require additional processing, such as still images containing text or video barcodes, closed captioned information, or URL text, is transmitted to a metadata processor 604 for processing into a format to be included in a metadata bundle 608. In addition, the raw captured images can be transferred to the metadata bundle 608 and, data from included raw captured images is extracted later. The receiver forms a metadata bundle 608 by combining elements from the bookmark metadata 600 and metadata extractor 604 captured at the time of the bookmark event. If available, personalized data 606, such as, in a non-limited example, zip code, name, address, phone, or email information, from a user may be captured and included in the metadata bundle 608. It is the server's job to determine a response that is appropriate to both the content that was bookmarked, as well as, if possible, the user who tagged the content.

The metadata bundle 608 may be delivered via Internet 612 to a Bookmark Server 620. In an exemplary implementation, the video source contained in the bookmarked program is identified through a database 624 query using, at a minimum, the channel map ID, channel number, and timestamp of the original airing of the content associated with the video bookmark. The identification of the video source that contained the bookmarked program may then be converted into a content identifier or content ID value. If the database query indicates that the bookmark event occurred within an advertisement, content ID values for both the program and that particular advertisement may be returned to the bookmark server 620 as a result of the query.

The content ID for a program identifies the series and episode, and can be associated through another database 624 query with various pieces of program-related metadata including:
- the URL of the home page of the series
- the URL of the home page of the episode
- pointers to pages relevant to actors, locations, events in the plot, products, special offers, or other relevant information of potential interest to a user.

Interactive applications may also be associated with stored bookmarks. An interactive application may be of the class of Triggered Declarative Objects (TDOs). In an exemplary implementation the trigger for a TDO may be bound to a particular program segment and reference the location where a downloadable interactive object may be acquired. The location could reference an Internet URL or a file downloaded with Non-Real-time Services (NRT). This downloadable object in the exemplary implementation when triggered by the capture of bookmark information is of the class of TDOs and may be created by a content creator or service provider, and may consist of declarative content such as text, graphics, scripts, and audio or audio/visual samples whose function and behavior is tied in some way to programming that accompanies the content. The TDO may then be associated with the content, or the subject of the content, that is captured when a bookmark is tagged or marked. Such interactive objects may be in the class of TDOs that may be resident on the Bookmark Server 620 and may then later be retrieved by the Bookmark Server through the TDO's association with the bookmarked content.

Additionally, the Bookmark Server 620 can take advantage of personalized data included in the metadata bundle 608 when creating its response. As mentioned, if the tagged material pertained to a product or service available in the viewer's local area, supplying the zip code of the viewer's residence allows the Bookmark Server 620 to return information tailored to that location, such as local phone numbers and driving directions.

Some users, if given the option, may be willing to offer more detailed personal information such as name and address, interests, description of the household (ages and genders, for example). If the service provider guarantees to respect the rights of privacy, and only to use the information to better respond with more relevant content, users may be willing to offer such specific information that may be included in the metadata bundle 608.

Even without detailed personalized information, the service provider can usually identify the general location of the user by use of the sender's IP address. The service provider is also able to generate usage statistics, and can know based on the number of "hits" on the server for particular requests, which items are generating the most interest among users.

In the exemplary implementation, the Bookmark Server 620 receives the processed data from the metadata bundle 608 and the additional information and content retrieved by the database queries and transmits the package of information associated with the bookmark event via the Internet 612 to a UI generator 628. The UI generator interacts with the received data and prepares a user experience 630 associated with a video bookmark requested by the user.

In an additional exemplary implementation the user may register for a video bookmark service by providing an e-mail address. The user may provide the e-mail address as a part of the personalized data included in the metadata bundle 608 that is transmitted through the Internet and to a bookmark server. The bookmark server may then compile the processed video bookmark related information and compose an e-mail message containing the processed information. The bookmark server may then transmit the created e-mail message containing the video bookmark content to the requesting user. Upon receipt at the web server, the receiving server compiles information related to, and associated with, a requested video bookmark. The server may then automatically compose an e-mail message containing the processed video bookmark content and send the composed e-mail to the requesting user. In an exemplary implementation, the user may establish an account with an Internet-based server by, for example, accessing a website using a regular web browser. The user identifies the web account when setting up the video bookmark server on a Digital Television (DTV) receiver. When a video bookmark event occurs, the receiver notifies a bookmark server by collecting some small amount of metadata from the information available in the broadcast content. The bookmark server may then convert the incoming metadata and content into a rich set of bookmark-related metadata that may include information and content retrieved from web sites or other storage sites with network connection to the bookmark server, as well as content generated within the bookmark server as being associated with the subject of the video bookmark metadata. The user's interaction with the saved bookmarks is now done by accessing the Bookmark Server website. The user experience, i.e. the "look and feel" of this service may be designed, established, and controlled by the service provider.

Figure 7:
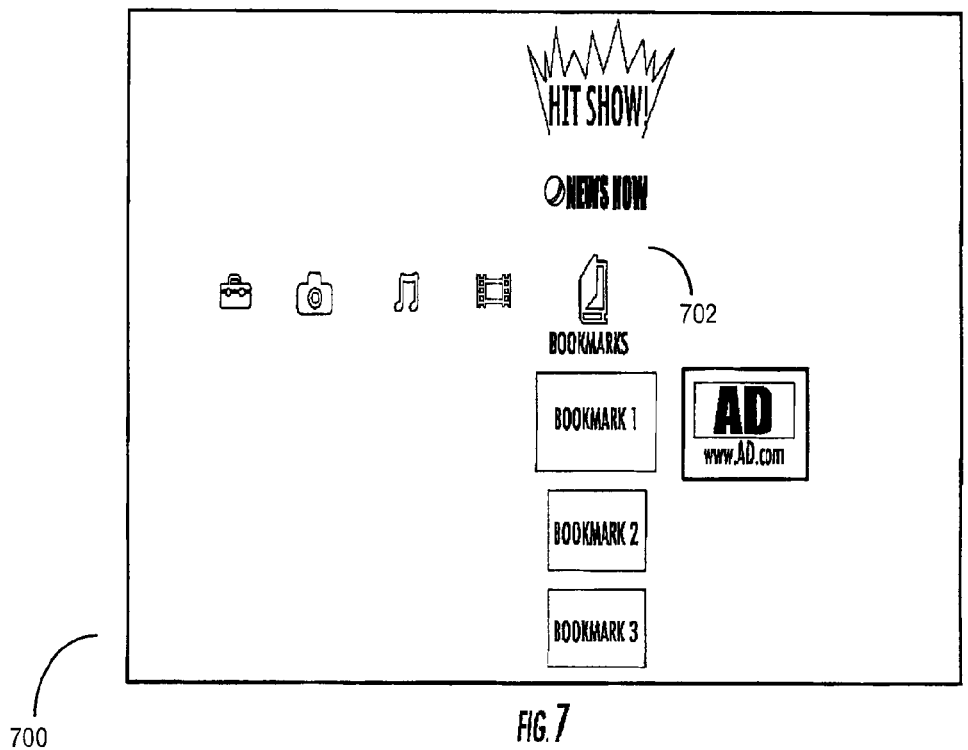
FIG. 7 is an illustrative example of a user interface for interaction between a user and video bookmarks consistent with certain embodiments of the present invention.

Turning now to FIG. 7, in an exemplary embodiment, a receiver that receives server-processed video bookmark content and associated metadata is responsible for creating a way for the user to navigate among bookmarked items, and for creating an appropriate representation for each video bookmark. In a non-limiting example, a screen capture, presented as a thumbnail on the video display, may serve as a good graphical icon for the bookmark. FIG. 7 shows an example user interface (UI) 700 based on Xross-Media-Bar (XMB) styling. XMB is a graphical user interface developed by Sony Computer Entertainment.

XMB styling provides a user interface in which major categories for action or information are presented as category icons in a horizontal list in the center of a video display. A user may select a category icon that is highlighted or may traverse the horizontal list to highlight a different category icon. The list of category icons may move left or right horizontally as the user traverses the list. The user may press a button on a remote control to indicate the highlighted category icon is selected for expansion. The selected category icon expands vertically to display content icons associated with the category icon. The content icons are displayed vertically upon selection, with the initial expansion occurring above and/or below the highlighted category icon, to present visual content icons associated with the selected category icon. The user may traverse the vertical list of content icons, highlighting each content icon as the user traverses the list. A content icon from the vertical list of content icons may be highlighted and selected to expand a selected content icon to display a sub-category of content icons that are associated with the selected content icon. In the exemplary embodiment, a category icon in the initial horizontal list may be a video bookmarks icon.

When the user selects the video bookmarks category, a number of thumbnail images appear in the column, each representing one of the bookmarks available for review. In a non-limiting example, the user bookmarked a political advertisement 702 as one bookmark for later review. In a non-limiting example, as a result of processing the bookmark at the processing server, the receiver is able to offer a link to the website where more information may he found. The information from a website associated with the video bookmark or the subject contained in metadata captured with a video bookmark may be retrieved from a URL enclosed in the metadata associated with a video bookmark. This data is returned to the UI and presented to the user upon selection of the icon associated with the video bookmark.

Figure 8:
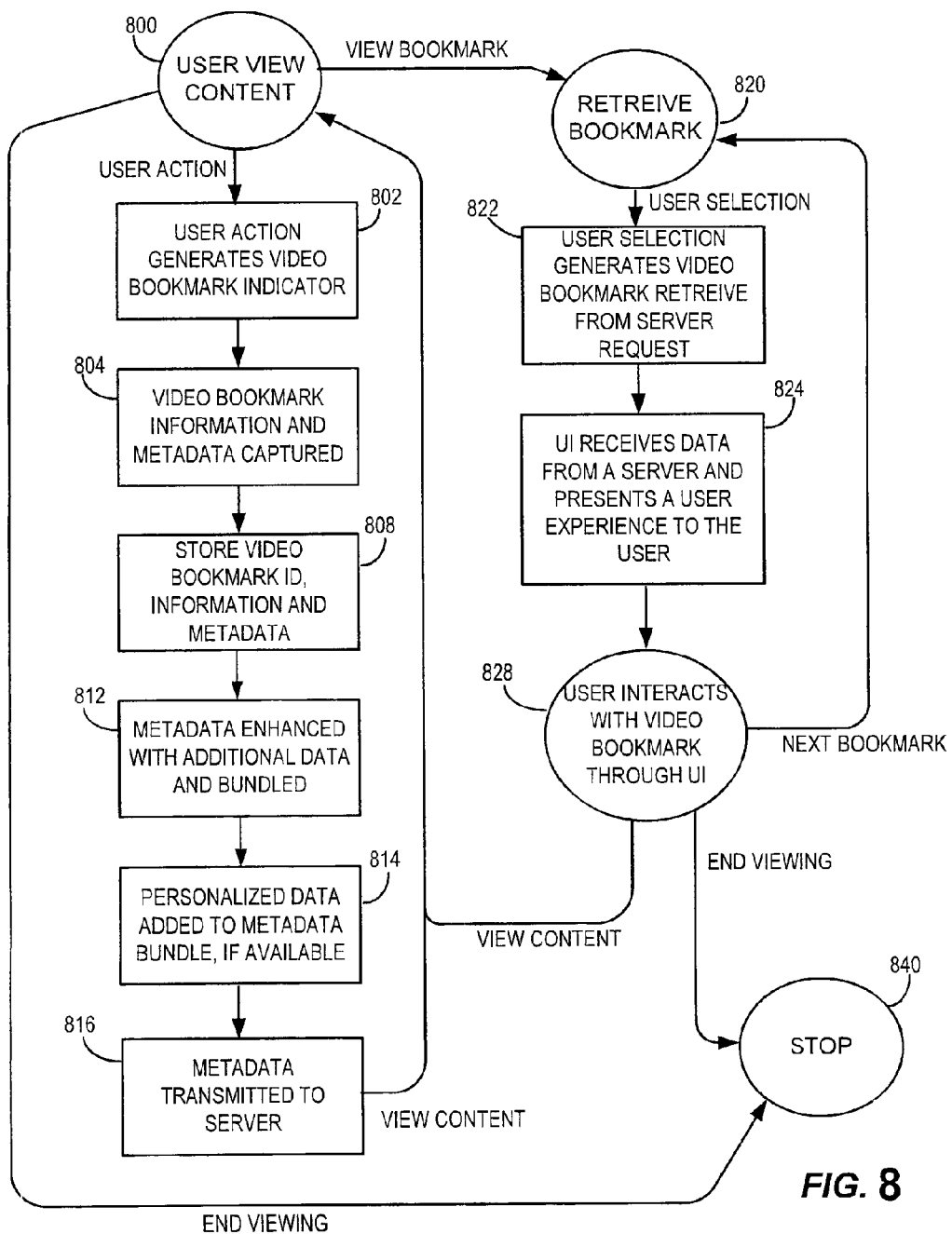
FIG. 8 is an illustrative example flow diagram for video bookmark capture and interaction consistent with certain embodiments of the present invention.

Turning now to FIG. 8, an exemplary implementation of a video bookmark system provides for a user, while involved in viewing content 800, to perform an action that generates a video bookmark indicator 802. The user action may in an exemplary implementation consist of pressing a button on a remote control specifically configured to initiate a bookmark capture action, the user may initiate a bookmark capture action by selecting a dedicated menu option on a display screen, or the user may provide input action to the system through other actions such as touching a selection point, providing a verbal selection choice, or any other method of interacting with the system to indicate a user choice or selection. In each case, at 804 the user action of selecting the video bookmark indicator causes the display receiver to capture and record all the relevant information and metadata pertinent to content being viewed near the instant of the user action. As the information is captured and stored, the audio/video content being viewed by the user is not interrupted or impacted in any way. The flow of the content, and of the user's enjoyment of the content, is not disturbed while the system performs the capture and storage of a video bookmark. At 808, the system stores a video bookmark ID and the captured information and metadata associated with the video bookmark. At 812, the system may enhance the captured metadata with, in a non-limiting example, additional information such as additional data retrieved from a URL that may be associated with the subject of the content captured or with personalized information supplied by the user. At 814, the enhanced information and metadata associated with the video bookmark is then collected into a metadata bundle and associated with the video bookmark. At 816, the video bookmark and the associated metadata bundle are transmitted to a server. In a non-limiting example, the server may be a web server in which the video bookmark ID and metadata bundle are not stored, but the web server may simply receive and fulfill requests from the video bookmark system metadata extractor for web-based content. In another non-limiting example, the server may be a bookmark server in which the video bookmarks and associated metadata bundle are transmitted to the bookmark server for storage under the video bookmark ID. After the video bookmark and associated metadata is transmitted to the server, the system returns to a state of user viewing content 800 and awaiting another indication of a video bookmark selection, retrieval of previously stored video bookmarks 820, or termination of the viewing activity by the user 840.

At 820, in this exemplary embodiment, as a result of a user selection action to view a video bookmark, the user enters the retrieve bookmark state whereupon the user may perform a selection action to retrieve a previously stored video bookmark. If a user has submitted a request to retrieve one or more video bookmarks at 822, the server, in response to the user request action, initializes a retrieval action for the video bookmark ID or IDs requested. At 824, a UI receives data associated with the video bookmark request from a server and builds the user experience for the retrieved video bookmark. The user experience may include reviewing clips of content captured near in time to the video bookmark event, retrieved audio/video content associated with the subject of the content that was being viewed at the time of the user action to capture the video bookmark, web content retrieved from a URL that is associated with the subject of the video bookmark, executable objects that may perform an interactive or non-interactive action for the user, textual information, or other content that is compiled or created by one or more servers based upon captured metadata associated with the video bookmark. At 828, the user may interact with the user experience presented by the video bookmark data presented by the UI by entering the state of interaction with retrieved video bookmark data through the UI. In this state, the user may review the video content bookmarked by the event, may view other audio or video content concerning the subject of the video content captured in the video bookmark, or may interact with executable content that has been retrieved by the server for presentation in association with the video content or subject of the content bookmarked. A user may choose to terminate the interaction with this video bookmark by requesting a next bookmark which may transfer the user interaction to the retrieve bookmark state 820. The user may alternatively choose to terminate the user video bookmark state at 828 and return to the user view content state at 800 to continue to view other content. At 840, the user may choose to terminate all interaction with the video bookmarks or other content and simply choose to stop the user interaction entirely.

Figures 9, 10:
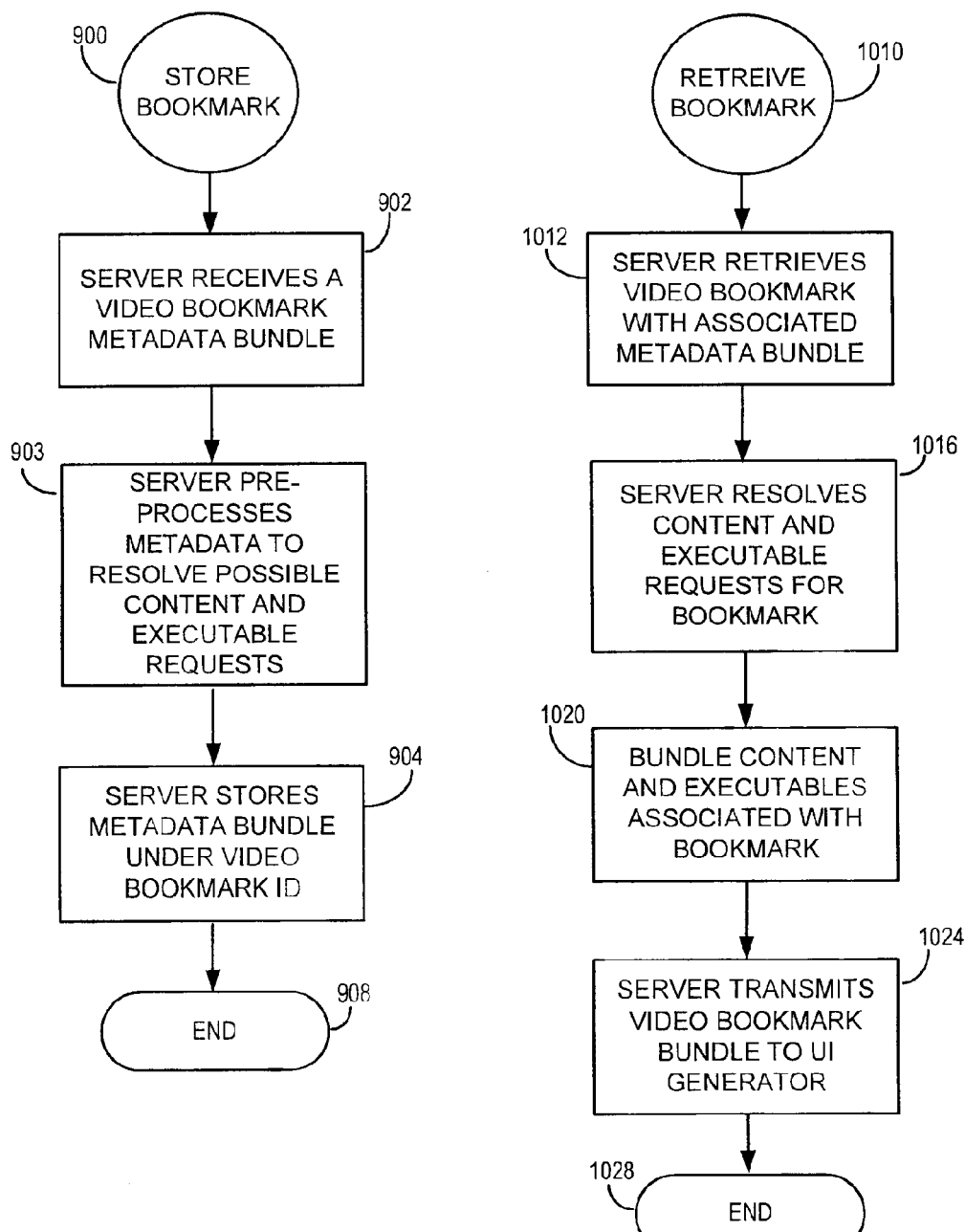
FIG. 9 is an illustrative example flow diagram of a server storage action for video bookmarks consistent with certain embodiments of the present invention.
FIG. 10 is an illustrative example flow diagram of a server retrieval action for video bookmarks consistent with certain embodiments of the present invention.

Turning now to FIG. 9, an exemplary implementation for of storing a video bookmark on a server is presented. A bookmark server is a server in which video bookmark data may be stored, along with associated information and metadata for later retrieval, compilation, and operation. At 900, a store bookmark action may be initiated automatically by the system when a user indicates through a user action that they want to capture a video bookmark. The store bookmark action occurs without the interaction of a user or any visual or audio indication to the user so that the user experience of viewing content is not interrupted. At 902, the bookmark server may receive a video bookmark metadata bundle from a display device as the result of a user action to capture a video bookmark. At 903, the server may take advantage of the opportunity to pre-process the incoming metadata bundle while there is a processing resource and time opportunity. The server may have both processing resources and time cycles available to resolve some or all of the subject, content, or executable references and requests in the incoming metadata bundle. As a result of this activity, the metadata bundle may be enhanced with resolved data, video or audio clips, subject matter content, executable objects, text, or any other content referenced in the received metadata bundle.

Not all references may be resolved prior to storing the partially resolved metadata bundle, however, those references that are resolved may be attached to the metadata bundle and may be stored with the received metadata bundle. This step may enhance the viewer experience upon later retrieval of the video bookmark by loading faster and minimizing processing required during retrieval of the video bookmark. At 904, the video bookmark may be stored within a storage device associated with a server using an associated video bookmark ID assigned to a captured video bookmark which the bookmark server may use as a key value for the storage and retrieval of both the video bookmark and the metadata bundle associated with the video bookmark. As described above, the metadata bundle may comprise text, information associated with the subject of the video bookmark, URLs, audio/video content or clips, executable objects, or any other data or content that may be associated with the video bookmark. At 908, the server process for storing a video bookmark is complete and the process ends.

Turning now to FIG. 10, this figure presents an exemplary embodiment for a retrieve bookmark request from a server at 1010. At 1012, in an exemplary embodiment, the server receives a retrieve bookmark request and retrieves a video bookmark and the metadata bundle associated with the video bookmark from the storage device associated with the server. In a non-limiting example, also at 1012, the bookmark server may retrieve all metadata associated with the video bookmark, including, but not limited to, captured still images, captured audio/video clips, a channel map ID, channel number, time of the video bookmark action, personalized data, URLs, close-captioned data and scraped text. At 1016, the bookmark server may then resolve any URL or other pointers to data, video or audio clips, subject matter content, executable objects, text, or any other content associated with the subject of the video bookmark that has not been previously resolved and attached to the video bookmark data package. The fully resolved content package containing all retrieved, resolved and updated content may be packaged as experience data associated with the retrieved video bookmark. At 1020, the bookmark server may bundle all retrieved, resolved and updated content, as well as any executable objects that may be associated with the subject of the video bookmark, into a video bookmark bundle and associates this video bookmark bundle with the video bookmark ID. At 1024, the bookmark server transmits the retrieved video bookmark and the associated video bookmark bundle to a UI generator. After transmission of the video bookmark and associated video bookmark bundle the server process terminates at 1028.

A video bookmark system for generating one or more event markers during video content viewing by a user selection action and capturing for each event marker timing and data about the subject of the video content at the time of the user selection action is presented. The content is stored in an electronic storage device each event marker, the associated event marker timing, and the data about the subject of the video content at the time of the event. Later a user, upon reviewing the stored event markers, may select at least one of the stored event markers where the selection retrieves associated subject data, retrieved video content, and generated content for presentation to a user on a video content display device.

The user selection action may consist of interacting with a button, display option on a video device, or other clearly indicated selection device or step to generate an event marker, where the event marker comprises a label indicating a point in the content that is of interest to a user. The event marker may be a video content bookmark, where the data captured for an event marker may consist of at least the date, time, channel, and video content subject data for the event marker and, if a user submits personal information may contain user supplied personal data. The stored data may also contain one or more URLs, captured video clip content, or dynamic objects associated with the video content on display when the event marker is generated.

The user may review stored event markers through an interactive video user interface and select any of the stored event markers to be retrieved from a content server. The generated content may include any of declarative content, metadata, URLs, audio clips, video clips, text, graphics, and generated interactive content associated with the subject data stored with the event marker.

The description herein provides for an apparatus for generating video event markers having a video display, a data capture device to capture a user selection and interact with the video display device to generate one or more event markers during video content viewing. The user selection captures for each event marker timing information and data about the subject of the video content being displayed at the time of the user selection. The apparatus also has an electronic storage device that may receive and store each event marker, associated event marker timing, and data about the subject of the video content being displayed at the time of the event. A user interface may display stored event markers for user review and selection of at least one of the stored event markers, and present event marker subject data, retrieved video content, and generated content on a video display device.

The apparatus may have a button, display option on a video device, or other clearly indicated selection device or step to mark an event. Marking an event may be done by interacting with a button, activating a device, or selecting a display option to indicate a user event marker selection to generate a video content bookmark. The video content bookmark may contain at least the date, time, channel, and video content subject data from the event marker and may also contain user supplied personal data when a user voluntarily submits such personal data. The stored data may also contain one or more URLs, captured video clip content, or dynamic objects associated with the video content on display when the event marker is generated.

A user may review stored event markers through an interactive video user interface on a video display device and select any of the stored event markers. Such selection by the user retrieves from a content server generated content including any of declarative content, metadata, URLs, audio clips, video clips, text, graphics, and generated interactive content associated with the subject data stored with the event marker The system may also receive a video bookmark generated through a user action consisting of at least a channel identifier, channel map, and a timestamp for the video bookmark. The received video bookmark may contain subject information, downloadable objects, and metadata generated in association with the video bookmark. The video bookmark and all received data, information, and objects are stored into a video bookmark data bundle in a video bookmark server. The video bookmark server associates the video bookmark data bundle with an identifier indicating a stored video bookmark has been saved. The user may retrieve at least one video bookmark data bundle upon a request to the server from the user. Upon such a request, the system builds in the server a video bookmark experience data bundle comprising metadata associated with the video bookmark, captured still images, captured audio/video clips, a channel map ID, channel number, time of the video bookmark action, personalized data, URLs, close-captioned data and scraped text. The retrieved video bookmark and video bookmark experience data bundle is transmitted from the server to a video display.

In an alternative implementation the system may generate one or more event markers during video content viewing by a user selection action. The user selection action captures for each event marker timing and data about the subject of the video content at the time of the user selection action. The user selection action comprises interacting with a button, display option on a video device, or other clearly indicated selection device or step to generate an event marker.

The event marker may consist of a label indicating a point in the content that is of interest to a user and the data captured for an event marker may consist of at least the date, time, channel, and video content subject data for the event marker. The data captured for an event marker further may include user supplied personal data where a user voluntarily supplies such data. Each event marker is stored in an electronic storage device in combination with the associated event marker timing, and the data about the subject of the video content at the time of the event. The stored data may also contain at least one or more URLs, captured video clip content, or dynamic objects associated with the video content on display when the event marker is generated.

A user may review the stored event markers through an interactive video user interface. Upon review, a user may select at least one of the stored event markers to retrieve associated subject data, retrieved video content, and generated content for presentation to a user on a video content display device. When the user selects any of the stored event markers a content server retrieves generated content including any of declarative content, metadata, URLs, audio clips, video clips, text, graphics, and generated interactive content associated with the subject data stored with the event marker.

While certain illustrative embodiments have been described, it is evident that many alternatives, modifications, permutations and variations will become apparent to those skilled in the art in light of the foregoing description.

What is claimed is:

1. A method of a system for generating bookmarks, the method comprising:
   receiving audio video content;
   reproducing the audio video content for display to a user;
   receiving a request to generate a bookmark during the reproducing of a segment of the audio video content;
   capturing, by circuitry of the system and in response to the request to generate the bookmark during the reproducing of the segment of the audio video content, a uniform resource locator (URL) for a downloadable interactive application associated with the segment of the audio video content; and
   downloading, using the captured URL, by the circuitry of the system, the downloadable interactive application associated with the segment of the audio video content.

2. The method according to claim 1, wherein the bookmark is associated with metadata that includes the URL, a bookmark title, date, and time.

3. The method according to claim 2, wherein the URL and the title are captured from a terrestrial broadcast of the audio video content.

4. The method according to claim 1, further comprising:
   storing the bookmark and the downloadable interactive application in a memory for subsequent retrieval by the user, wherein
   the step of downloading is performed in response to the request to generate the bookmark.

5. The method according to claim 1, wherein the step of downloading is performed when the bookmark is invoked by the user.

6. The method according to claim 1, wherein the step of downloading comprises:
   downloading the downloadable interactive application from a content server.

7. The method according to claim 1, wherein the step of downloading comprises:
   downloading the downloadable interactive application from a server when a request to view the generated bookmark is received.

8. The method according to claim 1, wherein the downloadable interactive application is configured to perform a function that is tied to the segment of the audio video content.

9. A system for generating bookmarks, the system comprising:
   circuitry configured to
      receive audio video content,
      reproduce the audio video content for display to a user,
      receive a request to generate a bookmark during the reproduction of a segment of the audio video content,
      capture, by circuitry of the system and in response to the request to generate the bookmark during the reproducing of the segment of the audio video content, a uniform resource locator (URL) for a downloadable interactive application associated with the segment of the audio video content, and
      download using the captured URL the downloadable interactive application associated with the segment of the audio video content.

10. The system according to claim 9, wherein the bookmark is associated with metadata that includes the URL, a title, date, and time.

11. The system according to claim 10, wherein the URL and the title are captured from a terrestrial broadcast of the audio video content.

12. The system according to claim 9, wherein the circuitry is configured to
   store the bookmark and the downloadable interactive application in a memory for subsequent retrieval by the user, and
   download the downloadable interactive application in response to the request to generate the bookmark.

13. The system according to claim 9, wherein the circuitry is configured to download the downloadable interactive application when the bookmark is invoked by the user.

14. The system according to claim 9, wherein the circuitry is configured to download the downloadable interactive application from a content server.

15. A non-transitory computer-readable storage medium storing a program which when executed by a computer causes the computer to perform a method for generating bookmarks, the method comprising:
   receiving audio video content;
   reproducing the audio video content for display to a user;
   receiving a request to generate a bookmark during the reproducing of a segment of the audio video content;
   capturing, by the computer and in response to the request to generate the bookmark during the reproducing of the segment of the audio video content, a uniform resource locator (URL) for a downloadable interactive application associated with the segment of the audio video content; and
downloading, using the captured URL, by the computer, the downloadable interactive application associated with the segment of the audio video content.

* * * * *